Feb. 18, 1969  F. O. MILLER  3,427,687
MOLD CONSTRUCTION
Filed Nov. 7, 1966

INVENTOR.
FREDERICK O. MILLER
BY
Learman, Learman & McCulloch

United States Patent Office 3,427,687
Patented Feb. 18, 1969

3,427,687
MOLD CONSTRUCTION
Frederick O. Miller, Saginaw, Mich., assignor to Miller Mold Co., Saginaw, Mich., a corporation of Michigan
Filed Nov. 7, 1966, Ser. No. 592,626
U.S. Cl. 18—35          10 Claims
Int. Cl. B29c 1/00; B29d 7/00

This invention relates to a mold construction for use in differential pressure forming of hot plastic sheet material and more particularly to a mold construction having separable parts and including improved means for cooling the mold parts and the parts molded therein.

In the molding of plastic sheet material such as polyethylene, polypropylene, and the like, the sheet is heated to a deformable state and is subjected to differential pressures so as to be molded to a form dictated by the configuration of a mold. The heat from the plastic material is transferred to the mold parts and, after frequent molding operations have been performed, it is not unusual for the temperature of the mold to rise to such level that the molded part is incapable of being cooled in the mold to a sufficiently low temperature to prevent slumping or other deformation of the molded part. As a consequence, the cycle of operation of the molding process must be limited, at least in part, by the ability to effect cooling of the mold.

Jacketed molds through which a cooling medium, such as water, may be circulated have been proposed heretofore. Most of these molds have relied upon heat extraction by the cooling medium from a relatively thick and heavy base or block in which the mold cavities are provided, the heat extraction being effected by the circulation of cooling water or the like through passages formed in the block. In conventional jacketed molds, it is not uncommon for the thickness of the mold base or block to be such that the transfer of heat from the cavity walls to the cooling medium is insufficient to enable the molding process to be cycled as fast as possible. Consequently, the speed of operation of the molding apparatus must be slowed so that the cooling action of the circulating fluid may be implemented by air cooling of the mold cavity walls.

An object of this invention is to provide a mold construction having improved means for effecting extremely rapid cooling of the mold cavity walls.

Another object of the invention is to provide a mold construction having means forming a mold cavity and which may be so constructed as to facilitate cooling of the mold parts and the part molded therein.

A further object of the invention is to provide a mold construction of the character referred to and wherein a base member is provided with a recess or cavity in which interchangeable mold parts removably may be secured, thereby enabling substitution of some parts for other parts.

Other objects and advantages of the invention will be pointed out specifically or will become apparent from the following description when it is considered in conjunction with the appended claims and the accompanying drawing, in which:

Figure 1:
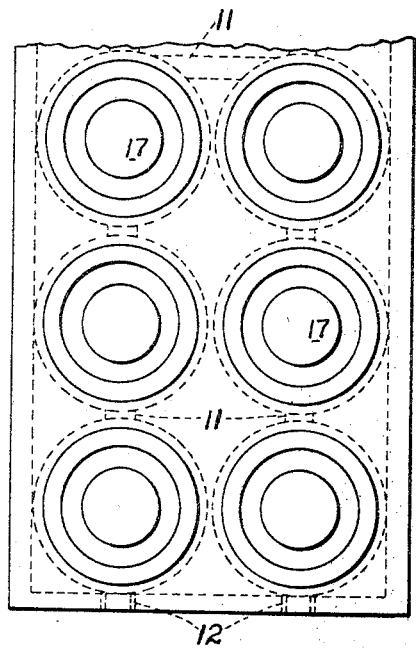
FIGURE 1 is a fragmentary, top plan view of a mold constructed in accordance with the invention.
Figure 2:
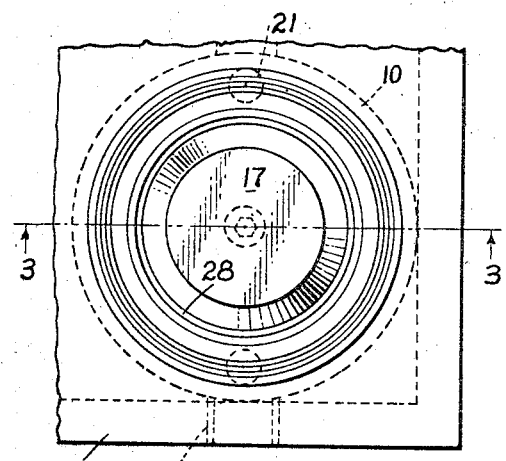
FIGURE 2 is an enlarged, top plan view of the apparatus shown in FIGURE 1.

Apparatus constructed in accordance with the invention comprises a mold block or base 1 adapted to be mounted on the bed 2 of a molding machine or the like or other suitable support. The base 1 is provided with upstanding walls 3 which define a plurality of generally cylindrical recesses 4 having open, upper ends. The lower ends of the recesses are closed by a wall 5 the lower surface of which is recessed to form a chamber 6 between the member 2 and the wall 5. Atop the walls 3 is secured a plate 7 having openings 8 therein in register with the recesses 4. Between the upper and lower ends of each recess 4, the side walls 3 are grooved as at 9 to form an annular chamber 10. Adjacent chambers 10 communicate with each other by means of ports 11 provided in selected walls 3, and selected recesses 4 communicate with ports 12 which, in turn, may be connected to a fluid reservoir from and to which a cooling medium such as water may be circulated through the chambers 10.

Figure 3:
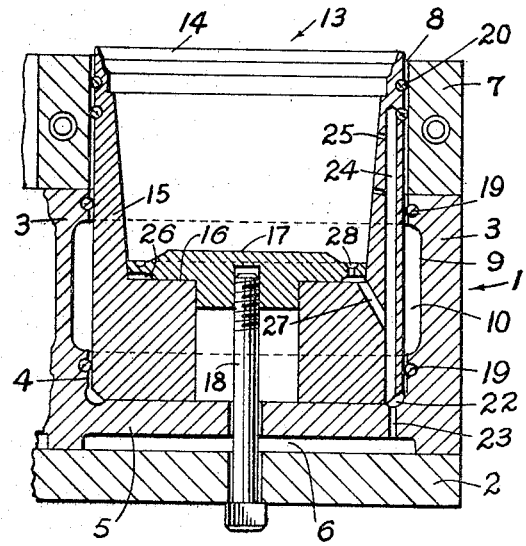
FIGURE 3 is a sectional view taken on the line 3—3 of FIGURE 2.

In the embodiment of the invention shown in FIGURE 3, each recess 4 accommodates a mold insert 13 comprising a tubular element 14 having a side wall 15 the external surface of which confronts the internal surfaces of the recesses 4 and 8, and the internal surface of which is shaped in accordance with the shape of a part to be molded. Between its ends the element 14 is provided with a shoulder 16 on which is seated a disk-like member 17 which forms a bottom wall or closed end for the element 14. The members 14 and 17 thus form a mold cavity. The member 17 is maintained in assembled relation with the element 14 and the latter is secured in the recess 4 by means of a clamping bolt 18 which passes through openings formed in the parts 2 and 5 and is threaded into the member 17.

When the mold insert 13 is assembled with the mold member 1 in the manner shown in FIGURE 3, the circulation of cooling water or other fluid through the chambers 10 will enable heat to be extracted from the side walls 15 of the member 13. The construction of the mold apparatus is such that the walls 15 may be relatively thin compared to the thickness of the walls 3, thereby permitting rapid cooling of the insert walls 15, facilitating cooling of the molded part and enabling the cycles of operation of the molding process to be increased.

The chambers 10 are sealed on opposite sides thereof by axially spaced sealing ring 19 provided adjacent opposite ends of the walls 3, and additional rings 20 are provided adjacent the upper end of the plate 7. The use of O-rings in the manner disclosed enables an effective seal to be achieved between the members 1 and 13 without subjecting the parts 17 and 18 to excessive forces.

The construction lends itself to vacuum or pressure differential molding techniques. Thus, the support member 2 may be provided with ports 21 communicating with the chamber 6 and the latter may communicate via a port 23 with a grooved passage 22 formed at the base of the recess 4. The side walls 15 of the element 14 may be axially bored as at 24 to communicate with the passage 22, and one or more branch passages 25 may provide communication between each bore 24 and the interior of the member 14. In addition, the lower surface of the member 17 may be provided with an annular groove 26 which communicates with the passage 24 via a port 27 and which communicates with the interior of the member 14 via ports 28.

The member 17 may be replaced by a similar member having a different configuration so as to provide a different shape for the part to be molded. Moreover, the insert mold member 13 may be replaced in its entirety by a different insert member.

Figure 4:
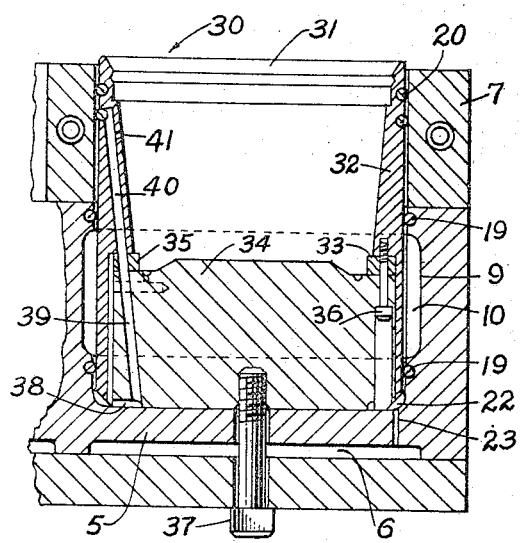
FIGURE 4 is a view similar to FIGURE 3, but illustrating a modification.

One type of substitute insert mold member is represented generally by the reference character 30 and comprises a tubular element 31 having side walls 32, the element 31 having an internal shoulder 33 between its ends. Seated on the shoulder 33 is a disk member 34 which forms the bottom wall of a mold cavity. Preferably, a compression ring 35 is interposed between the shoulder 33 and the member 34, but the ring is not essential. The members 31 and 34 are clamped against each other by suitable bolts, one of which is shown at 36, and the member 34 is maintained assembled with the base 1 by a clamping bolt 37. In the FIGURE 4 embodiment, the lower surface of the member 34 is grooved to provide a chamber 38 which communicates with the passage 22 and with a passage 39 formed in the member 34. The passage 39 registers with a passage 40 formed in the walls 32 and which communicates with the interior of the member 31 via one or more ports 41.

The disclosed embodiments are representative of presently preferred forms of the invention but are intended to be illustrative rather than definitive thereof. The invention is defined in the claims.

I claim:

1. A mold construction comprising a base member having side walls defining a recess; an annular mold member removably received in said recess and having side walls in confronting relation with said side walls of said base member, the side walls of at least one of said members being grooved to provide a chamber extending about said mold member; sealing means interposed between said members on opposite sides of said chamber; passage means in said base in communication with said chamber for circulating coolant through said chamber; and means removably securing said mold member in said recess.

2. The construction set forth in claim 1 wherein said groove is formed in the side walls of said base member.

3. The construction set forth in claim 1 wherein said mold member comprises a tubular element having an internal shoulder; and wherein said securing means comprises a part seated on said shoulder.

4. The construction set forth in claim 3 including clamp means reacting between said part and said tubular element for clamping the latter against said port.

5. The construction set forth in claim 1 including first fluid passage means in the side walls of said mold member and second fluid passage means in said base in register with said first fluid passage means.

6. A mold construction comprising a base member having side walls defining a substantially cylindrical recess; an annular mold member removably received in said recess and having side walls confronting the side walls of said base member, the side walls of at least one of said members having an annular groove therein forming a chamber; passage means in said base member communicating with said chamber and through which coolant may be circulated; axially spaced apart sealing means interposed between the confronting side walls of said members on opposite sides of said chamber; and means removably securing said mold member to said base member.

7. The construction set forth in claim 6 wherein said groove is in the side walls of said base member.

8. The construction set forth in claim 6 wherein said annular mold member has a shoulder thereon, and wherein said securing means comprises a part seated on said shoulder and forming a bottom for said mold member.

9. The construction set forth in claim 8 wherein said part is separable from said mold member.

10. The construction set forth in claim 6 including first fluid passage means in said base member, and second fluid passage means in said mold member, said passage means communicating with the interior of said mold member and with said first fluid passage means.

References Cited

UNITED STATES PATENTS

| 2,951,260 | 9/1960 | Harrison et al. | |
| 2,985,914 | 5/1961 | Miller | 18—35 X |
| 3,160,920 | 12/1964 | Busch | 18—35 |
| 3,290,418 | 12/1966 | Best | 18—35 |
| 3,267,521 | 8/1966 | Kostur | 18—35 X |

J. HOWARD FLINT, JR., *Primary Examiner.*